Nov. 1, 1966  R. P. CAPPS  3,282,557
ELECTRICALLY ACTUATED UNIDIRECTIONAL ROTARY DRIVE
HAVING ADJUSTABLE STOPS FOR
DAMPER CONTROL AND THE LIKE
Filed March 16, 1964  4 Sheets-Sheet 2

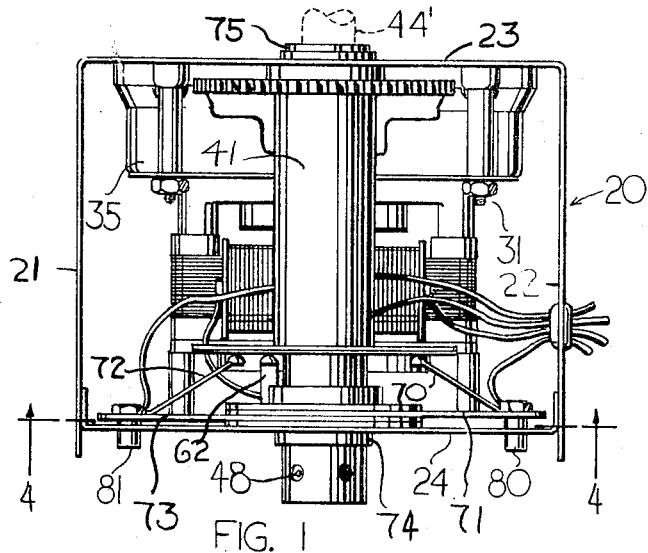
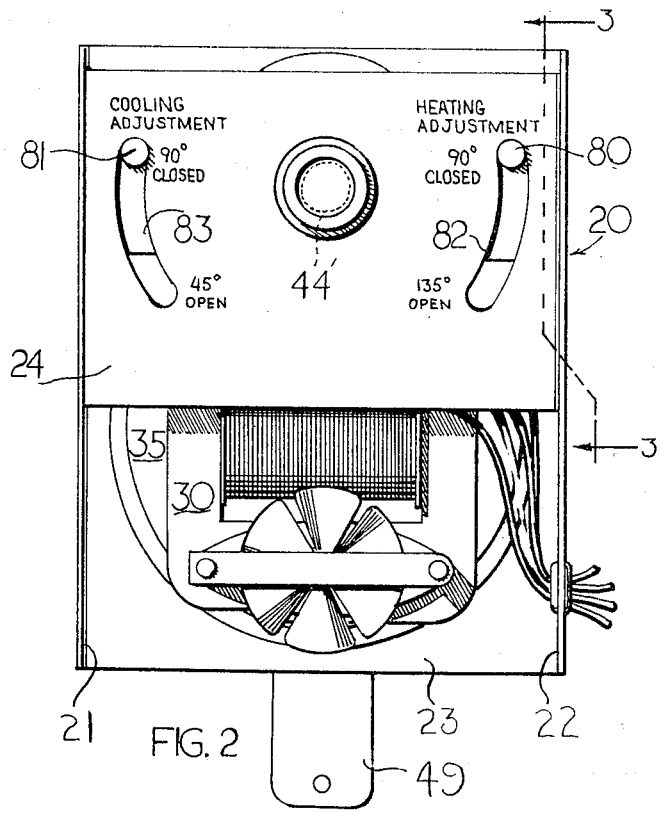

INVENTOR.
Randolph P. Capps.
BY
B. B. Olive
ATTORNEY

Nov. 1, 1966 R. P. CAPPS 3,282,557
ELECTRICALLY ACTUATED UNIDIRECTIONAL ROTARY DRIVE
HAVING ADJUSTABLE STOPS FOR
DAMPER CONTROL AND THE LIKE
Filed March 16, 1964 4 Sheets-Sheet 3

INVENTOR.
Randolph P. Capps.
BY
B. B. Olive
ATTORNEY

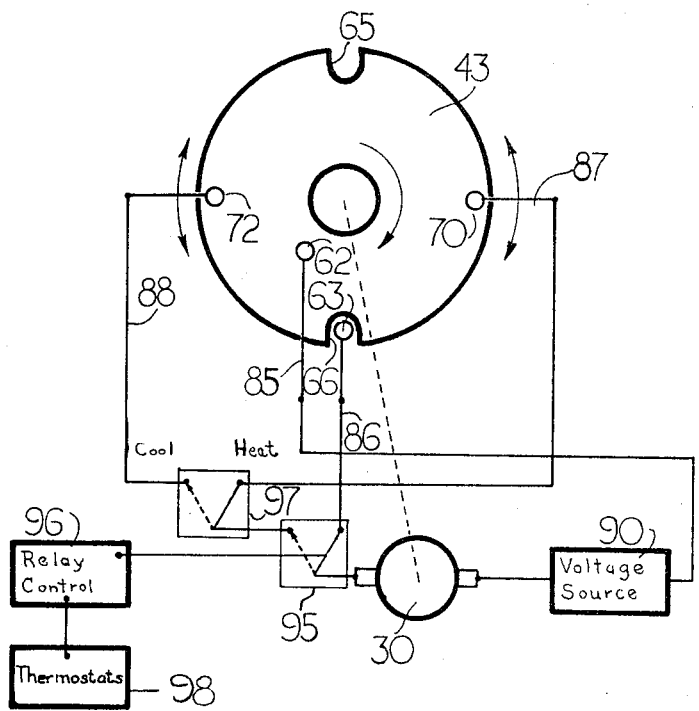
FIG. 6
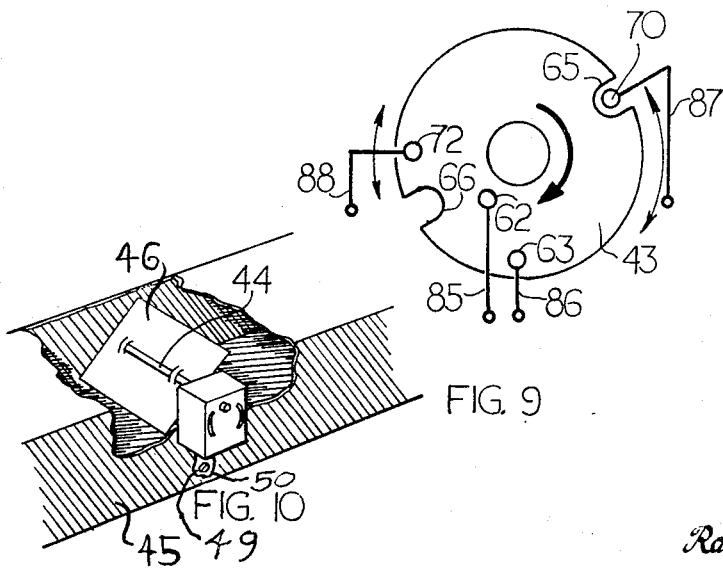
FIG. 9
FIG. 10

United States Patent Office 3,282,557
Patented Nov. 1, 1966

3,282,557
ELECTRICALLY ACTUATED UNIDIRECTIONAL ROTARY DRIVE HAVING ADJUSTABLE STOPS FOR DAMPER CONTROL AND THE LIKE
Randolph P. Capps, Lynchburg, Va., assignor to Multi-Zoner, Inc., Lynchburg, Va., a corporation of Virginia
Filed Mar. 16, 1964, Ser. No. 352,187
4 Claims. (Cl. 251—134)

This invention is generally concerned with electrically actuated unidirectional rotary drive mechanisms. More especially, the invention is concerned with an electrically actuated rotary drive of a type which can be employed for positioning dampers such as are used in zone heating and cooling control and which provides stop positions that can be adjusted.

Various forms of modern residential construction such as ranch and split level styles are difficult to zone for heating and cooling with conventional forms of damper actuators since conventional damper actuators usually have either a fixed full open or a fixed full close position and no means for easily obtaining a range or positions between full open and full close. Reversible, bi-directional actuators are frequently employed. Rooms are frequently too hot or too cold because of the difficulty in balancing a system. Another situation which affects damper positioning occurs when a large and small zone are being controlled together and the small zone only is demanding heat. In such case, it is frequently desirable to bypass some of the heat to the large zone to avoid excessive duct velocities and noise problems in the small zone. In order to accomplish this, it is necessary to be able to adjust the close damper position of the large zone such that the damper will never fully close but rather for close position will come to some intermediate position. Adjustable close stop positions are equally desirable for cooling zone control as well as in other air handling environments particularly where it is necessary to maintain some minimum air flow.

In a co-pending application Serial No. 352,024, filed March 16, 1964, entitled Heating and Cooling Control for a Plurality of Zones, there is disclosed and claimed a conrol system adapted to both heating and cooling zone control and which illustrates how a rotary drive mechanism of the type disclosed by this application may be applied. The present application is therefore directed primarily to the rotary drive mechanism per se and not to the overall control system which is the subject matter of the referred to co-pending application.

An object of the present invention is therefore to provide an electrically actuated unidirectional rotary drive especially suited to employment as a damper actuator.

Another object is to provide an electrically actuated unidirectional rotary drive especially suited to employment as a damper actuator and which has an unlimited number of stop or limit positions within a given range that can be easily obtained.

Another object is to provide an electrically actuated unidirectional rotary drive especially suited to employment as a damper actuator and which has an unlimited number of stop or limit positions within a given range when applied in both heating and cooling control.

Another object is to provide an electrically actuated unidirectional rotary drive especialy suited to employment as a damper actuator and which can be very quickly attached and removed from the shaft of the damper being actuated.

These and other objects will appear as the description proceeds. For a more thorough understanding of the invention, reference is now made to the drawings, in which:

FIGURE 1 is a plan view of a rotary drive mechanism embodying the invention.

FIGURE 2 is a front elevation view of the mechanism of FIGURE 1.

FIGURE 6 is a schematic diagram illustrating the invention applied to a heating-cooling control.

FIGURE 9 is a schematic representation of the switching mechanism in a different position.

FIGURE 10 is a cut-away perspective illustrating a damper actuator installation.

Figure 7:
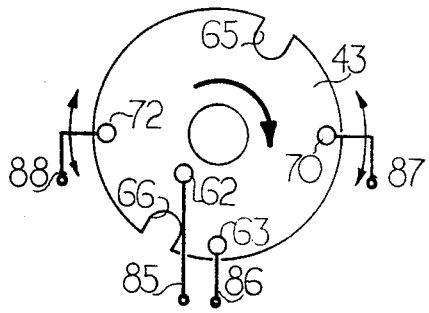
FIGURE 7 is a schematic representation of the switching mechanism in one position.
Figure 8:
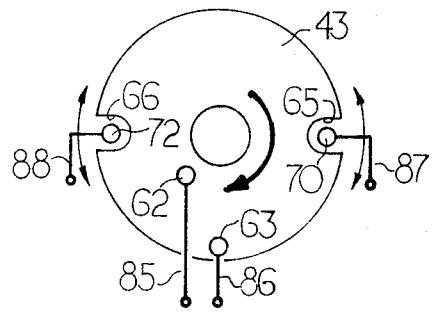
FIGURE 8 is a schematic representation of the switching mechanism in a different position.

Referring now to the drawings the invention is shown applied to an electrically actuated, unidirectional, rotary drive mechanism suitable for employment as a damper actuator for both heating and cooling control in single and multi-zone applications. As illustrated, there is shown a housing 20 in the form of a bent U-shaped channel having sides 21, 22 and a back 23. Extending between the front edges of the two sides 21, 22 is a front panel 24 which is suitably secured to the sides 21, 22.

A conventional alternating current, preferably low voltage, unidirectional motor 30 is secured to the back 23 by means of suitable mounting screws such as at 31. Motor 31 is rigidly secured to and drives a gear reduction box 35 also mounted on the back 23. A motor fan 36 cools the motor as the motor turns. Through various gears, not shown, which are contained in gear box 35, motor 30 drives a gear 40 at a relatively slow speed in the order of ten revolutions per minute. Since both motor 30 and gear box 35 may be of conventional form and form no part of the invention per se except as combined with other elements, the motor 30 and gear box 35 are not described in further detail.

Figure 5:
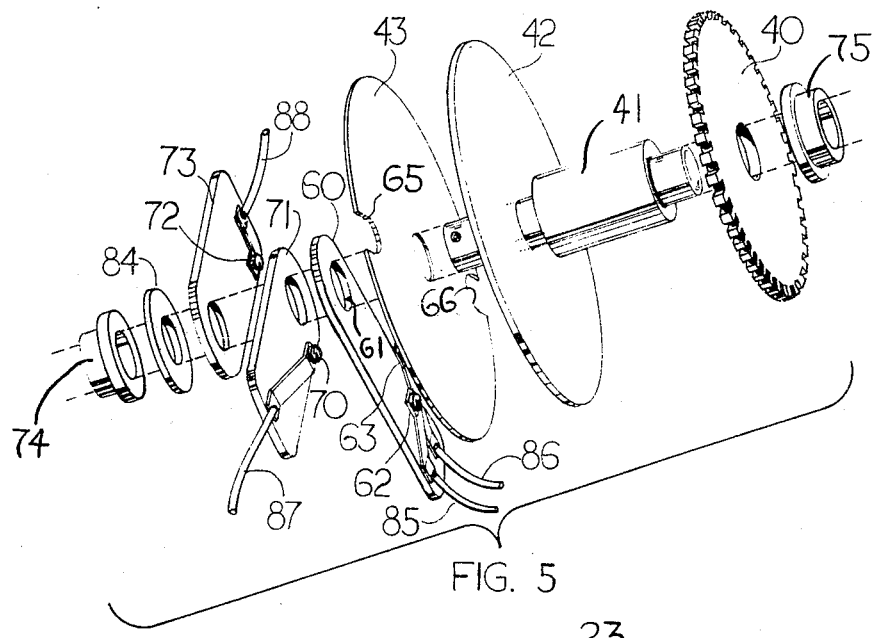
FIGURE 5 is an exploded view of various switching elements employed.

Gear 40 is an annual gear and is rigidly secured to an elongated hollow, cylindrical hub 41 which is shaped as best shown in FIGURE 5 for supporting various elements later referred to. Also mounted on hub 41 is a commutating device which includes an annular disc 42 of insulating material on the face of which is glued or otherwise secured an annular disc 43 of conducting material. Thus, whenever motor 30 is energized, gear 40 is driven which causes hub 41 to rotate and since the conducting disc 43 is secured to the rotatable hub member 41, it also rotates. That is, there is co-rotation of the hub and disc.

Figure 3:
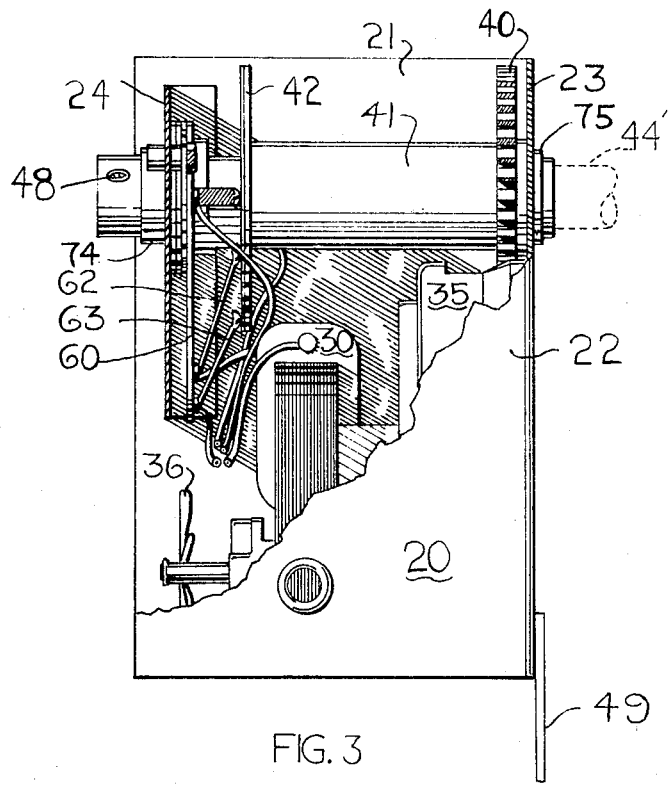
FIGURE 3 is a partial cut-away side elevation view taken generally along line 3—3 of FIGURE 2.
Figure 4:
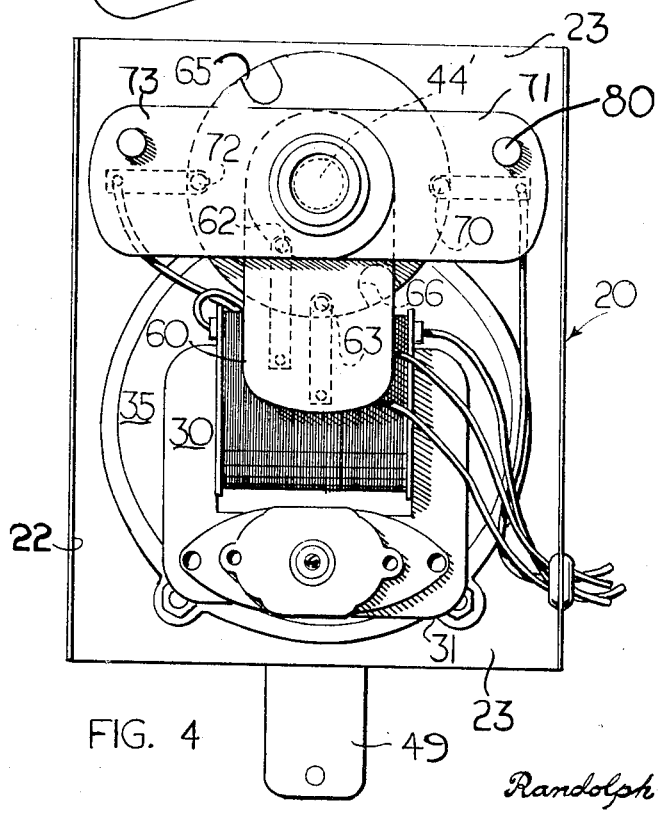
FIGURE 4 is a front sectional elevation taken along line 4—4 of FIGURE 1.

In order to better understand the later discussion, reference is next made to FIGURE 10 showing the mechanism of the invention installed and in which 44 represents the damper shaft, 45 represents a fragmentary section of the side of an air duct and 46 represents a damper installed in the duct. In FIGURES 2, 3 and 4 the damper shaft is represented in dotted lines 44'. As indicated in the referred to figures, the damper shaft is mounted within the hollow hub 41 and is secured thereto by set screws 48. The housing 20 is further secured to the duct side 45 by means of a strap member 49 which is welded to the back 23 and which receives a suitable screw 50 (FIGURE 10) that holds the strap 49 to the duct side 45. Aside from making wiring connections, the mechanical installation requires only that the damper shaft be inserted in and secured to the hub by set screws 48 and the housing secured to the duct by screw 50. Installation is simple and can be completed quickly. Once so installed, it can be seen that the position of the damper 46 is determined by the position of hub 41 which is driven by gear 40 through gear box 35 from motor 30. The discussion will next turn to the means by which energization of motor 30 is controlled so as to be able to vary the position at which damper 46 will stop particularly when directed to come to a damper close position.

Control of energization of motor 30 is made through four circumferentially spaced wiper contacts two of which are fixedly positioned and two of which are rotatably positionable about the axis of hub 41. With respect to the two fixed wiper contacts, there is provided a rectangular shaped piece of insulating support board 60 (FIGURE 5) having a hole 61 through which hub 41 extends in a fit such that the very slow rotation of hub 41 does not tend to rotate board 60. The main body of board 60 extends downwardly as best shown in FIGURE 4 and on its lower extremity there are affixed two wiper contacts 62, 63. Contact 62 is adapted to constantly engage a conducting central portion of disc 43 and as later described serves as a common current path for the several circuits that may be established. Unlike contact 62, contact 63 can contact both conducting and non-conducting portions of the periphery of disc 43. This can be seen by noticing that disc 43 has cut-out portions at 65 and 66 so that any contact falling into such a cut-out portion strikes only the insulating material of non-conducting disc 42 and when in such cut-out portion the contact does not conduct. Contact 63 is so mounted on board 60 that it will come in contact with the cut-out non-conducting portions of disc 43 as the disc turns. Therefore whether contact 63 is or is not in a conducting state depends on the position of disc 43 since whenever contact 63 is in either of the cut-out portions 65 or 66 it will not conduct but if not in either cut-out portion, it will conduct.

The two rotatably positionable contacts are provided by contact 70, mounted on the rotatable insulating board 71, and by contact 72 which is mounted on the rotatable insulating board 73. That is, contacts 70 and 72 are fixed to the respective boards 71, 73 but the boards themselves are rotatable about the axis of hub 41. In order to assist in the positioning of boards 71, 73 the boards are provided with short pins 80, 81 which are secured to the face of the respective boards and which extend through the respective slots 82, 83 provided in the front panel 24 (FIGURE 2). Rotatable support for hub 41 is provided by a bearing 74 mounted in plate 24 and by a bearing 75 mounted in back 23. A spacer washer 84 (FIGURE 5) assists in maintaining the assembly of the various boards mounted on hub 41, the boards being effectively squeezed between spacer washer 84 and disc 43. Contact 62 is connected to a lead 85 (shown in FIGURES 5–9); contact 83 is connected to a lead 86; contact 70 is connected to a lead 87 and contact 72 is connected to a lead 88.

From the foregoing description, it can be seen that contact 62 constantly engages a central conducting portion of disc 43 and is adapted to serve as a common or ground contact. It can also be seen from the schematic FIGURES 6, 7, 8 and 9 that contacts 63, 70 and 72 are positioned to conduct at all times except when positioned in one of the cut-out portions 65, 66. That is, when disc 43 is driven by motor 30, contacts 63, 70 and 72 will be in a conducting state so long as they rest on the conducting peripheral portion of disc 43 and will be in a non-conducting state as they respectively move into one of the non-conducting cut-out areas 65, 66.

In the embodiment of the invention being used in the description as an example of the invention's application, there is shown a damper actuator mechanism suitable for positioning a damper in a fixed full open or in any of a number of closed positions between full closed and less than full closed as for example forty-five degrees off vertical. Independent closed positioning is provided for heating and cooling control. That is, the damper 46 (FIGURE 10) can be positioned to a closed position for heating control and to a separate completely independent closed position for cooling control. In FIGURE 2, for example, as pin 80 is manually adjusted up and down in slot 82 it controls the position of board 71 and consequently the position of contact 70. FIGURE 6, for further example, can be taken as representing contact 70 being located in the middle of slot 82 whereas FIGURE 9 can be taken as representing the position of contact 70 when board 71 has been rotated until pin 80 strikes the top of slot 82. In a similar manner contact 72 can be changed in position by manipulating pin 81 in slot 83 since pin 81 is secured to board 73 on which contact 72 is mounted.

FIGURE 6 illustrates generally one circuit arrangement utilizing the invention and in which there is indicated a voltage source 90 in series with the motor 30. Contact 62 in the FIGURE 6 illustration is permanently in series with the motor 30 and the voltage source 90. The other side of motor 30 is connectable to contact 63, 70 or 72 depending on the position of a switch 95 controlled by a relay control 96 and of a manually positionable switch 97. In a heating and cooling zone control system of the type previously referred to in connection with the mentioned copending application, relay control 96 is controlled by appropriate thermostat switches 98 in each zone and control 96 includes suitable relays operated by the thermostat switches. Assuming for example that manual switch 97 is set to the solid line position indicated, relay control 96 would then select between connecting the motor to either contact 63 or contact 70. Assuming further that contact 63 is employed when it is desired to open the damper, relay control 96 would be arranged to move switch 95 to its solid line position in FIGURE 6 when the damper was required to be opened and would move switch 95 to its dotted line position when the damper was required to be closed. Thus, if conducting disc 43 has the position shown in FIGURE 6 when the damper is full open and switch 95 is in its solid line position contact 63 will be non-conducting since it will be residing in the cut-out portion 66 as shown in FIGURE 6. Under such condition, if relay control 96 under the influence of an appropriate thermostat switch 98 now moves switch 95 to its dotted line position (manual switch 97 remaining at its solid line position), contact 70 will become conducting since it is on a conducting portion of disc 43 in FIGURE 6. Disc 43 now starts rotating since motor 30 is energized and is causing gear 40 and consequently hub 41 and disc 43 to turn as depicted in FIGURE 7. Rotation continues until disc 43 assumes the position of FIGURE 8 at which time contact 70 will come into the cut-out portion 65 and will become non-conducting at which time disc 43 will stop rotating and the damper will assume a corresponding closed position. This closed position can be, in the embodiment illustrated in FIGURE 2, either a full closed, vertical or ninety degree, position or it can be off vertical and partially closed in any position between a one hundred thirty-five degree (forty-five degrees off vertical) and the full closed position. The obtaining of these different closed positions is represented in FIGURE 9 in which contact 70 is shown rotated counter-clockwise from its position in FIGURES 7 and 8. Where a system demands a critical balance of the closed position of a particular damper, the installer can simply adjust the pin 80 to the proper position and have the assurance that for closed position the damper will always return to the position corresponding to the position in which pin 80 is left.

As a further important aspect of the invention those skilled in the art will appreciate that contact 63 can be used for both heating and cooling damper open position control and that a completely independently closed position for cooling control can be obtained simply by switching switch 97 to its dotted line position in FIGURE 6. That is, contact 72 can be positioned independently of contact 70 since boards 71 and 73 (FIGURE 5) are independently positionable. Thus when relay control 96 and thermostats 98 include both heating and cooling control, switch 97 can be set for cooling control or for heating control. When the system is originally installed, both heating and cooling closed damper positions can be set by independently positioning the respective pins 80 and 81 to whatever respective positions are required for the particular system being balanced.

In summary, the invention provides a rotary drive mechanism especially adapted to serving as a damper actuator for both heating and cooling control. The invention provides a means for obtaining independent adjustment of closed damper positions for both heating and cooling control. Installation and removal of the damper actuator are greatly simplified by reason of the installer only having to slip the damper shaft into the hollow driving hub and secure the shaft to the hub and the housing of the mechanism to the side of the duct.

Having described the invention, what is claimed is:

1. An electrically actuated damper apparatus for controlling flow in a duct comprising a damper; a shaft rotatably mounting said damper in said duct; a housing secured to one side of said duct; a rotatable member mounted in said housing coaxial with said shaft; means drivingly connecting said member and shaft; a unidirectional electric motor; means drivingly connecting said motor and member; a disc arranged for co-rotation with said member, said disc having a major central electrically conducting portion and a peripheral conducting portion which includes a pair of diametrically opposed peripheral non-conducting areas; a first wiper contact arranged to constantly engage said central portion; a second and third circumferentially spaced wiper contacts arranged to engage said peripheral portion such that one is always disengaged from said non-conducting areas when the other is engaged and such that at least one is available in its peripheral position; a voltage source; and means to selectively place said motor, source and first contact in series with whichever one of said second and third contacts is on a conducting portion of said peripheral portion thereby enabling said first contact to be paired with the adjustable contact to establish a circuit for bringing said damper to a position, as for closing, which can be regulated by adjusting the adjustable contact and to be paired with the other contact to establish a circuit for bringing the damper to another independent position, as for opening.

2. In an electrically actuated damper apparatus as claimed in claim 1 in which said rotatable member comprises hollow hub adapted to receive said shaft and said means drivingly connecting said member and shaft comprises means securing said hub to said shaft.

3. In an electrically actuated damper apparatus as claimed in claim 1 including a fourth circumferentially spaced and peripherally disposed adjustable contact diametrically opposed to the previously referred to adjustable contact and switch means to connect said fourth contact in place of said previously mentioned adjustable contact thereby enabling the obtaining of circuits for positioning said damper to one position, as for damper heating closed, which can be independently regulated by adjusting the previously referred to adjustable contact, for positioning said damper to another position, as for damper cooling closed, which can be independently regulated by adjusting said fourth adjustable contact and for positioning the said damper to a still further position, as for damper heating or cooling open, which is independent of the positions obtained with either of said adjustable contacts.

4. An electrically actuated damper apparatus for controlling flow in a duct comprising a damper; a shaft rotatably mounting said damper in said duct; a housing secured to one side of said duct; a rotatable hollow elongated hub mounted in said housing and adapted to receive said shaft and being secured thereto; means drivingly connecting said motor and hub; a disc mounted coaxial with said shaft and arranged for co-rotation therewith, said disc having a major central electrically conducting portion and a peripheral conducting portion which includes a pair of diametrically opposed peripheral non-conducting areas; a first wiper contact arranged to constantly engage said central portion; second, third and fourth circumferentially spaced wiper contacts arranged to engage said peripheral portion, said third and fourth contacts being diametrically opposed and adjustable in peripheral position and in respect to said second contact being arranged such that when said second contact is located in either of said non-conducting areas both said third and fourth contacts are located on peripheral conducting portions and when either of said third and fourth contacts is located in either of said non-conducting areas, said second contact is located in a peripheral conducting portion; switch means for alternatively connecting said third and fourth contacts; a voltage source; and means to selectively place said motor, source, and first contact in series with said second contact or one of either said third or fourth contacts, dependent on the position of said switch means, thereby enabling the obtaining of circuits for positioning said damper to one position, as for damper heating closed, which can be independently regulated by adjusting said third contact, for positioning said damper to another position, as for damper cooling closed, which can be independently regulated by adjusting said fourth contact and for positioning the said damper to a still further position, as for damper heating or cooling open, which is independent of the positions obtained with either of said adjustable contacts.

References Cited by the Examiner

UNITED STATES PATENTS

| | | | |
|---|---|---|---|
| 2,977,437 | 3/1961 | Doane | 251—134 X |
| 3,190,609 | 6/1965 | Kintigh | 251—134 |

M. CARY NELSON, *Primary Examiner.*

R. C. MILLER, *Assistant Examiner.*